Sept. 4, 1928.
C. B. MIRICK
1,683,090
ELECTRICAL SYSTEM
Filed July 10, 1925
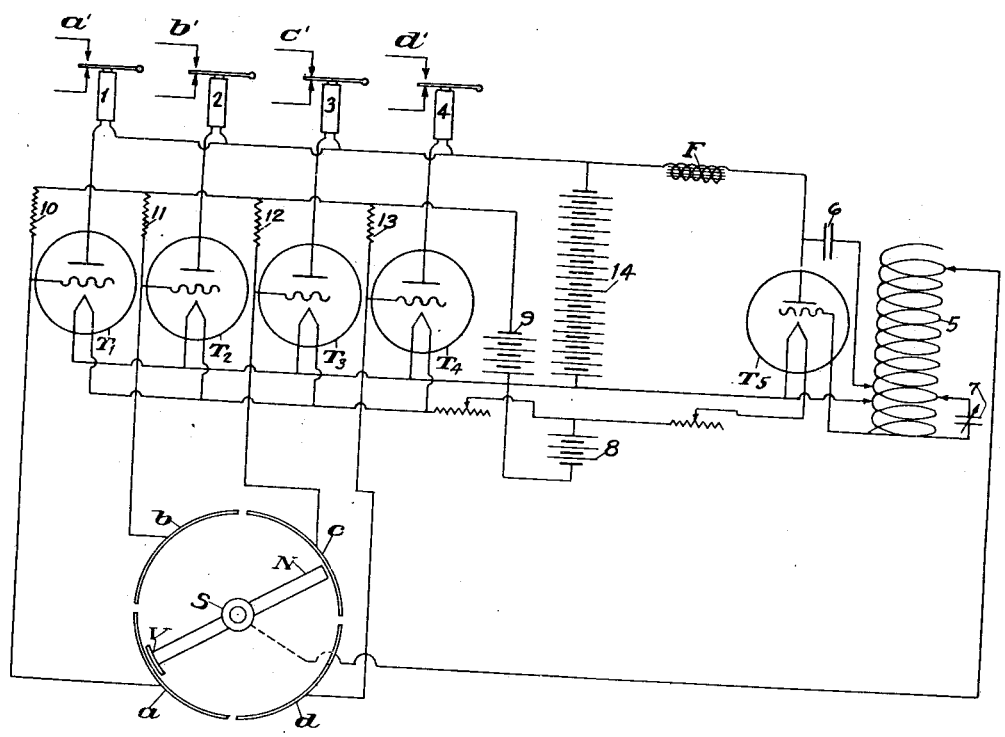
Inventor
Carlos B. Mirick
By Robert A. Lavender
Attorney Patented Sept. 4, 1928.

1,683,090

UNITED STATES PATENT OFFICE.

CARLOS B. MIRICK, OF WASHINGTON, DISTRICT OF COLUMBIA.

ELECTRICAL SYSTEM.

Application filed July 10, 1925. Serial No. 42,777.

My invention relates generally to electrical systems, especially switches or circuit closers, but more particularly to a switch not requiring a physical contact between its elements.

An object of my invention is to provide a means for closing an electric circuit through a frictionless switch.

Another object of my invention is to provide a frictionless switch for alternating currents, more particularly high frequency currents.

Further objects of my invention will appear more fully hereinafter.

My invention consists substantially in the construction, combination, location and relative arrangement of parts and circuit arrangements associated therewith, all as will be more fully hereinafter set forth as shown by the accompanying drawings and finally pointed out in the appended claims.

Reference is to be had to the accompanying drawing forming a part of this specification in which is shown a fixed embodiment of my invention and in which:

N represents the arm or lever of an electric switch, supported in position on the spindle S. On N is mounted a metal plate V, of such size and shape as to form one capacity area of an electrical condenser, the other capacity area of the condenser being a similar plate or a selected one of several similar plates (four are shown in the drawing) secured in such position that as the switch arm N is moved to its various positions the plate V comes into a close parallel relation to the plates $a$, $b$, $c$, or $d$, thereby forming an electrical condenser with one of these plates. The device so far described is the only apparatus required in case the switch is to be used to pass small high frequency or alternating currents.

If it is desired to control direct currents, or large high frequency or alternating currents, an auxiliary and preferably high frequency alternating current is used, as a condenser in a direct current circuit will completely block the flow of that current, or construction difficulties will be encountered where large high frequency or large alternating currents are to be controlled. When controlling with the aid of an auxiliary high frequency current fixed plates $a$, $b$, $c$, and $d$ are connected to the grids of four vacuum tubes $T_1$, $T_2$, $T_3$, and $T_4$, which tubes control the plate circuit relays 1, 2, 3, and 4. Auxiliary current for influencing the grids of vacuum tubes $T_1$, $T_2$, $T_3$, and $T_4$ is generated by vacuum tube $T_5$ associated with inductance 5, condensers 6 and 7, a device well known in the art. Battery 8 heats the filament of all the vacuum tubes and battery 14 furnishes the plate potential for all of the tubes. Battery 9 and associated resistances 10, 11, 12 and 13 control the grid biasing of the tubes $T_1$, $T_2$, $T_3$, and $T_4$, the grid bias being preferably substantially negative to hold the plate currents of the tube to low values when not in operation.

The operation of this device is as follows: Switch arm N is moved by any means to the position shown. The arm may, for instance, be the needle of a magnetic compass. The oscillating current generated by tube $T_5$ is transferred across the condenser formed by V and $a$ and flows to the grid of $T_1$. The resulting change in the plate current of $T_1$ causes relay 1 to operate, closing or opening contact $a'$ according to the circuit connections of that contact. Similarly relays 2, 3 and 4 are controlled by plates $b$, $c$, and $d$ and vacuum tubes $T_2$, $T_3$, and $T_4$ respectively.

It may be noted that two capacities in series enter into the operation of the system shown. One is the capacity at the point of the frictionless circuit closer, and the other is the capacity between the grid and filament of the tubes $T_1$, $T_2$, $T_3$, and $T_4$. In order that the change of the circuit closer capacity may predominate in the circuit it must always be smaller than the grid filament capacity of the tubes. As the reactances due to these two capacities vary inversely with the frequency the device will be independent, in this respect, of the frequency changes of the auxiliary oscillating currents generated in $T_5$ and associated circuits.

Should it be desirable to immerse the switch in a liquid to dampen the action of the arm or lever, oil would be suitable for electrical work. If so immersed the size of the plates may be decreased or the spacing between the plates V and $a$ may be increased to compensate for the higher dielectric constant of the oil.

It will be understood that the above disclosure and the accompanying drawing comprehend only a single embodiment of my invention and that various changes in construction, proportion and arrangement of parts may be made within the scope of the disclosure and appended claims without sacrificing any of the advantages of my invention.

Having described my invention what I claim is:

1. In an electrical indicator system, the combination of a plurality of vacuum tube relays having grid-filament and plate-filament circuits, a plurality of electro-magnetic relays, the coil of each one of which is disposed in the plate-filament circuit of its corresponding vacuum tube, a vacuum tube oscillator and means for coupling the vacuum tube oscillator to each grid of the vacuum tube relays independently of the other relays.

2. In an electrical indicator system, the combination of a plurality of vacuum tube relays having grid-filament and plate-filament circuits, a plurality of electro-magnetic relays the coil of each one of which is disposed in the plate-filament circuit of its corresponding vacuum tube, a vacuum tube oscillator and means for coupling the vacuum tube oscillator to each grid of the vacuum tube relays independently of the other relays, said means consisting of a capacity switch.

3. In an electrical indicator system, the combination of a plurality of vacuum tube relays having grid-filament and plate-filament circuits, a plurality of electro-magnetic relays, the coil of each one of which is disposed in the plate-filament circuit of its corresponding vacuum tube, a vacuum tube oscillator, a capacity switch for coupling the vacuum tube oscillator to the individual grids of the vacuum tube relays, said switch consisting of a plurality of arcuate plates arranged about a center, and a movable plate pivoted upon the center to move in close proximity to each of the arcuate plates, said movable plate being electrically connected to the vacuum tube oscillator, and each of said arcuate plates electrically connected to the grid of its corresponding vacuum tube.

4. In an electrical indicator system, the combination of a plurality of vacuum tube relays having grid-filament and plate-filament circuits, a plurality of electro-magnetic relays, the coil of each one of which is disposed in the plate-filament circuit of its corresponding vacuum tube, a vacuum tube oscillator, means for coupling the vacuum tube oscillator to each grid of the vacuum tube relays independently of the other relays and means for maintaining a negative grid bias upon the grids of the remaining vacuum tube relays.

5. In an electrical indicator system, the combination of a plurality of vacuum tube relays having grid-filament and plate-filament circuits, a plurality of electro-magnetic relays, the coil of each one of which is disposed in the plate-filament circuit of its corresponding vacuum tube, a vacuum tube oscillator, means for coupling the vacuum tube oscillator to each grid of the vacuum tube relays independently of the other relays, said means consisting of a capacity switch, and means for maintaining a negative grid bias upon the grids of the remaining vacuum tube relays.

6. In an electrical indicator system, the combination of a plurality of vacuum tube relays having grid-filament and plate-filament circuits, a plurality of electro-magnetic relays, the coil of each one of which is disposed in the plate-filament circuit of its corresponding vacuum tube, a vacuum tube oscillator, a capacity switch for coupling the vacuum tube oscillator to the individual grids of the vacuum tube amplifiers, said switch consisting of a plurality of arcuate plates arranged about a center, a movable plate pivoted upon the center to move in close proximity to each of the arcuate plates, said movable plate being electrically connected to the vacuum tube oscillator and each of said arcuate plates electrically connected to the grid of its corresponding vacuum tube, and means for maintaining a negative grid bias upon the grids of the remaining vacuum tube relays.

CARLOS B. MIRICK.